June 30, 1942. C. L. FITZ 2,288,079
MOTION PICTURE APPARATUS
Filed July 10, 1939 2 Sheets-Sheet 1
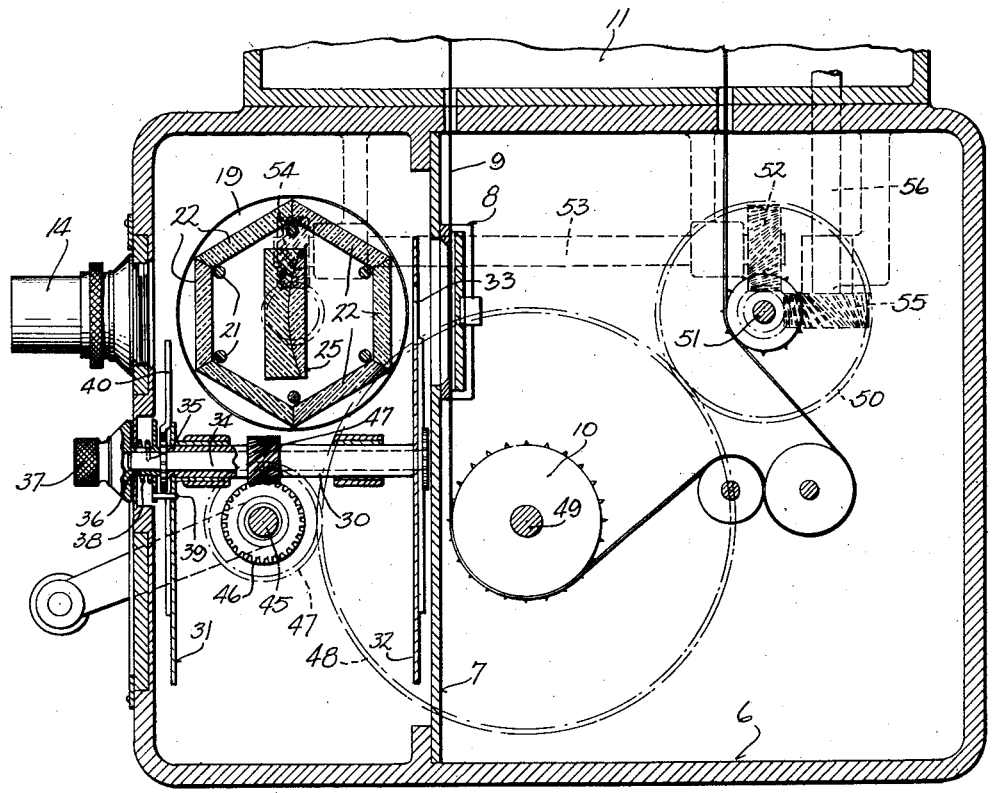
Fig. 1.
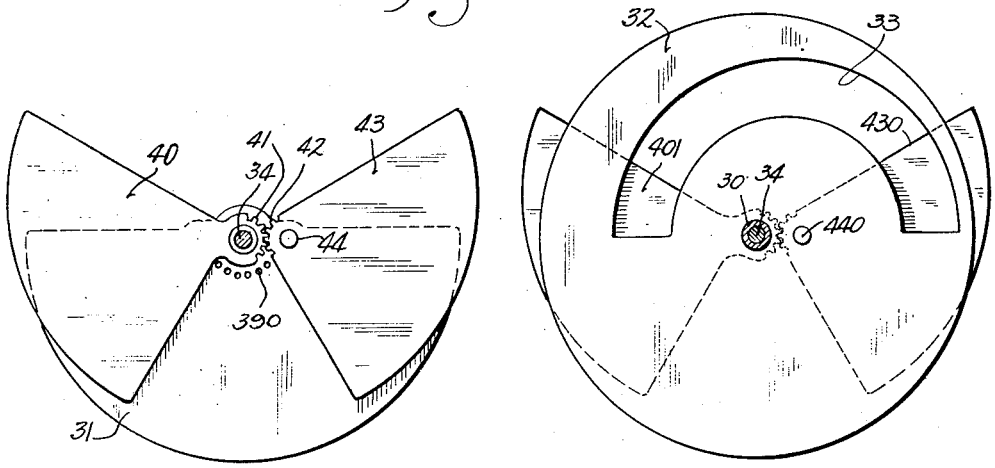
Fig. 2.
Fig. 3.
INVENTOR.
CHARLES L. FITZ
BY
Wheeler, Wheeler & Wheeler
ATTORNEYS.

INVENTOR.
CHARLES L. FITZ
BY Wheeler, Wheeler & Wheeler
ATTORNEYS.

Patented June 30, 1942

2,288,079

UNITED STATES PATENT OFFICE 2,288,079

MOTION PICTURE APPARATUS

Charles L. Fitz, Three Lakes, Wis., assignor of one-third to F. H. Dobbs and one-third to F. C. Cheatham, both of Three Lakes, Wis.

Application July 10, 1939, Serial No. 283,599

8 Claims. (Cl. 88—16.8)

This invention relates to improvements in motion picture apparatus, with particular reference to an optical system intended for use both in cameras and projectors.

The optical system is of a type in which continuous film movement is permitted with respect to the lens. Broadly speaking it is the primary object of the invention to correct astigmatism and distortion heretofore observed in systems of this character.

This invention is primarily concerned with correction of distortion from two sources. The first is the aberration or astigmatism produced by the prism which is interposed between the lens and the film as a means of giving the image the approximate movement of the film during the period of exposure. Because of this aberration or astigmatism, and also because of the necessity for color correction, the lens or optical unit hereinafter to be described will ordinarily have to be made up of several elements, including at least a chromatic doublet or perhaps two such doublets.

The second source of distortion, and the one to which this invention is primarily directed, is distortion caused by the variation in the apparent travel of the image as compared with the constant travel of the film. Where a prism is interposed between a lens and a film moving at a constant rate, the rate of rotation of the prism being also constant, it will be obvious to those skilled in this art that the projection of a refracted light ray from the prism upon the film will have successive increments of travel which will decrease in each successive unit of angular movement of the prism toward the center line of the optical system, and will increase in each successive unit of angular prism travel beyond the center line of the system.

Specifically, it is a major object of this invention to provide an optical system in which, throughout a substantially increased range of prism rotation each increment of angular prism movement will produce an identical angular increment of image movement corresponding exactly with the corresponding linear increment of film movement. It will be apparent to those skilled in the art that an optical system producing this result will give improved results where the range of exposure is small in terms of prism rotation, and it will make possible a shutter opening through a considerably increased angle of prism rotation as compared with any optical system which has heretofore been practical.

A closely related factor concerns the focus of the lens with reference to the film. It is one of the purposes of the present invention to provide an optical system in which, despite the fact that the film is moving rectilinearly, and despite the fact that the shutter is open to a very substantial extent of film movement, the length of light travel is maintained more nearly constant between the lens and the film than has heretofore been possible through any corresponding range of movement, whereby the focus is maintained sharper for a given range.

There are cameras and projectors in operation in which continuous film movement is practiced, in which attempts at correction have been made either by grinding lenses on the surfaces of the prism or by passing the film through a curved gate concentric with the optical center of the projection lens or by limiting the exposure to so small an angle of prism rotation as to minimize the errors. All of these corrective factors have been helpful, and the last named factor of reducing the shutter opening to a minute angle has been successful, but because of the cumbersome and expensive apparatus required and the high speed factor at which such apparatus has had to operate, severe limitations have been imposed upon its use. It is one of the objects of the present invention to minimize the expense and weight of a device embodying the invention and to provide a relatively inexpensive optical system which can be easily operated without requiring special lens or emulsion speeds and subject to wide control as to duration of exposure.

Other objects will appear from the following disclosure of the invention.

In the drawings:

Fig. 1 is a view in longitudinal section through a motion picture camera embodying the invention, the film magazine being broken away.

Figs. 2 and 3 are views in rear elevation of the front and rear shutters respectively.

Like parts are identified by the same reference characters throughout the several views.

Figure 4:
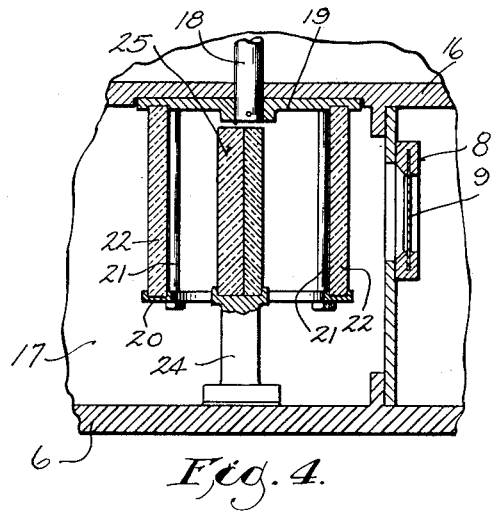
Fig. 4 is a fragmentary horizontal section through the prism correcting element and film gate structure.

It will be understood by those skilled in the art that the illustration and description of my invention from the standpoint of the motion picture camera shown in Fig. 1 will illustrate the use of the invention for other purposes including a projector, the projector being merely a counterpart in which the light travels in the other direction through the system. Details of the camera unimportant to an understanding of the invention are not shown.

The camera case 6 is provided with an apertured partition at 7 upon which is mounted the gate 8 through which the film 9 is continuously driven downwardly by means of the sprocket 10. As above indicated, the film is withdrawn from a magazine in the magazine chamber 11, detachably mounted on the camera case 6, and returned to the conventional take-up roll in the magazine chamber. Neither the magazine nor take-up roll are illustrated since they have no bearing on the present invention.

Figure 5:
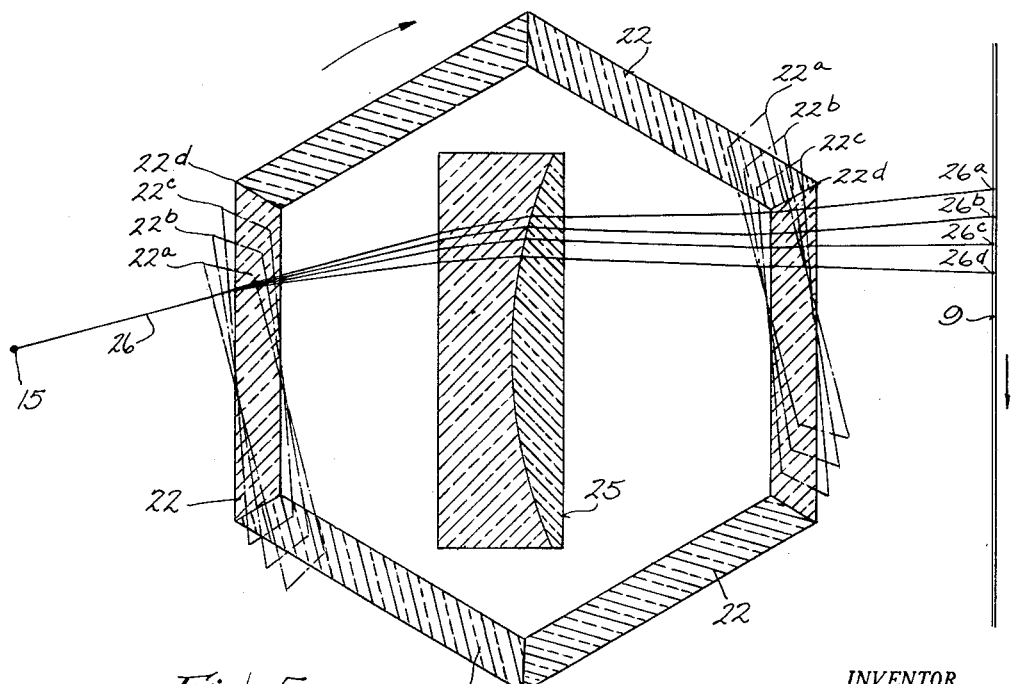
Fig. 5 is an enlarged view diagrammatically illustrating the optical effect of the prism and corrective units.

The lens barrel 14 will be understood to house a conventional lens of which the optical center is diagrammatically illustrated at 15 in Fig. 5. Between the lens and the film is my improved prism and optical correcting unit now to be described.

The prism ordinarily employed in a device of this character is a solid prism. The present invention seeks to apply the corrective factors internally rather than externally of the prism. The prism is made hollow and the corrective element hereinafter generically referred to as a lens, though it may be substituted by another prism or an optical flat, depending on the correction required, is placed at the center of the prism.

The partition 16 extends longitudinally of the case, and through it into the optical compartment 17 projects a shaft 18 carrying the prism cage. On the end of the shaft is a disk 19 to which the ring 20 is held by bolts 21. Corresponding grooves in the heads 19 and 20 of the cage receive the optical flats 22 which comprise the facets or surfaces of the prism. The prism is a hollow polygonal member having an even number of sides so that parallel flat faces pass each other across the axis of shaft 18. The optical effect of a hollow prism in refracting a ray of light is identical with the optical effect of a solid prism of like external contour. The prism may have any number of faces, 4, 6, or more being preferred. A six faceted prism is illustrated.

Carried by the side wall of the camera case 6 by means of a support 24 which projects through the ring 20 of the prism cage, is a stationary corrective lens 25 which is here illustrated as a doublet but which may have any number of elements and any form required to fit any desired correction. It is easily possible to apply well known optical laws to determine what the corrective effect of the lens unit 25 should be. The important thing from the standpoint of the present invention is to locate this lens unit within the rotary prism and preferably with its optical center coinciding with the center of the prism axis.

It will be observed that when a ray of light transmitted through the lens barrel 14 and lens 15 to the interior of the camera case reaches the corrective lens unit 25, it has passed through only one of the optical flats 22 comprising the hollow prism. It still must pass through the opposite optical flat at the other side of the hollow prism. Consequently the correction applied by the corrective lens unit 25 is an over-correction which anticipates the amount of correction that will be required as a result of the traverse by the light of the optical flat 22 at the rear of the shallow prism.

Assuming that the film is moving downwardly in Fig. 1 and Fig. 5, it will be necessary to rotate the prism clockwise. Fig. 5 shows four successive prism positions and the effect of the optical system on a single light ray emanating from the lens 15 in each of said positions. The important thing to note is that the corrective lens unit at 25 not only corrects for the first plate 22 encountered by the light ray, but also anticipates the correction to be required by the second plate, with the result that the apparent advance of the image is uniform. When the light ray 26 encounters the first flat 22 of the hollow prism in the first position illustrated in Fig. 5, the flat is at the location shown in dotted lines at 22a. The light ray reaches the film at 26a. In moving to the second dotted line position 22b, the hollow prism rotates for a given angular distance which may be assumed to be unitary. In the course of this angular movement of the hollow prism the light ray is reflected to the point on the film travel which is shown at 26b. When the prism rotates to the dotted line position shown at 22c it has again travelled the unitary angular distance, and the distance between the point 26c and the point 26b is identical with the distance between point 26b and point 26a. When the optical flat reaches the position shown in full lines at 22d it has again travelled a unitary angular distance, and again the apparent travel of the light ray to the point 26b is a fixed linear distance along the path of film movement. Throughout an exceptionally wide range of rotation of the prism a given increment of prism rotation will invariably produce a given increment of apparent image movement along the path of film travel.

The diagram in Fig. 5 only attempts to show this particular corrective factor of the corrective optical unit 25, whereby like increments of angular movement of the prism produce like increments of apparent rectilinear movement of the image along the path of film travel. The necessary formulae for calculating the lenses are well known and may be found, for example, in such works as "Elements of Optics" by Dr. Jos. Valasek, and "Der Kinematograph und Das Sich Bewegende Bild" by Dr. Carl Forch (Wein und Leipzig).

Two separate shutters are preferably used, both of which intercept the light entering the camera case through the lens barrel, being provided with adjustable wings or vanes for varying the exposure while keeping the range of exposure centered with reference to the optical axis of the lens 15 in the barrel.

It will be understood that the image projected by the primary lens will have an apparent movement with the film for a distance corresponding to the desired length of exposure. The shutter will then cut off the exposure of the film to the light and while the shutter continuously intercepts the light the hollow prism will rotate just sufficiently to bring another pair of opposed faces into the range at which the next succeeding exposure will start, whereupon the shutter will uncover the lens and the image will again commence to travel with the film and at the same rate. The front shutter comprises a segment 31 of 180 degrees extent. The other shutter also includes a framing slot which is eccentric so that the image passed to the film will be outlined at top and bottom by shutter surfaces moving at the same rate as the film. The mechanism is as follows:

The sleeve 30 supports at its forward end a 180 degree shutter segment 31. At its rear end it supports a 360 degree shutter segment 32 which, however, is provided with an eccentric arcuate opening at 33 of 180 degrees extent. The eccentricity is such, as previously indicated, that the slot 33 approaches the center line or optical axis of the optical system at the same rate as the rate at which the film advances, so that so long as the shutter is open a given length of film will remain centered in the slot 33 and outlined by the upper and lower margins of the slot.

Extending through the sleeve 30 is a shaft 34 having at its outer end a pin 35 upon which is splined a tube 36 with which knob 37 is connected. Tube 36 extends through the front wall of the camera case and the knob 37 is exposed for manipulation. A compression spring 38 normally holds the knob 37 in its innermost position where a peg 39 carried by the knob is selectively engaged in any one of a series of openings at 390 in the shutter segment 31. By pulling outwardly on knob 37 it is possible to release the knob from the shutter segment, whereupon the knob may be rotated to turn the shaft 34 with respect to the sleeve 30 upon which the shutter segment is mounted.

The shaft 34 supports an adjustable shutter vane at 40 which may be angularly operated, thereby to extend arcuately the surface of the shutter segment 31. The hub portion of this vane is provided with segmental teeth at 41 meshing with the complementary teeth 42 of a second vane 43 pivoted to the shutter segment at 44. Thus the vanes 40 and 43 are operated in unison in opposite directions. To the same degree that the extent of the shutter segment is increased angularly by one of the vanes, it is also increased angularly by the other. This reduces the time of exposure represented by the opening between vanes 40 and 43. It not only reduces the time of exposure, but keeps the exposure opening between the vanes centered with reference to the axis of the optical system, so that the same amount of exposure occurs before one of the flat faces 22 reaches a position normal to the optical axis as occurs after the optical flat passes a position normal to the optical axis.

An identical arrangement is provided on the shutter disk 32. The vane 401 corresponds to vane 40 and is mounted at the rear end of the shaft 34. The vane 430 corresponds to vane 43 and is pivoted at 440 on vane 32, the two vanes having segmental gear teeth whereby vane 430 is operated equally and oppositely to vane 401. It will also be observed that vanes 40 and 401 move together while vanes 43 and 430 move together. Vanes 401 and 430 control the arcuate length of the slot 33. For some purposes it may be desired to omit one or the other of these shutters. I prefer to use both shutters in order to control the light adjacent the primary lens 15 as well as adjacent the film as a means of preventing the possibility of fogging the film.

The various moving parts are driven in any desired manner. By way of illustration I have shown the drive shaft 45 provided with a first gear 46 which drives gear 47 on sleeve 30 to rotate the shutters. The drive shaft 45 has a second gear 47 meshing with gear 48 on the shaft 49 which carries the film sprocket 10 to control the film movement. Gear 48 meshes with gear 50 on shaft 51 which transmits motion through gear 52, shaft 53, and gear 54, to the shaft 18 which carries the rotatable hollow prism. Also driven from shaft 51 is the gear 55 which operates shaft 56 to motivate the take-up reel (not shown) in the magazine cylinder 11. Any other driving arrangement which will actuate the film, the prism, and the shutter mechanism in continuous synchronous, non-intermittent movement, will be satisfactory.

The same optical system may be used without change in a projector where the film is illuminated from the rear. The same relation between film movement, prism movement, and shutter movement will exist, and the same corrective factors will ordinarily be required. In referring to the primary lens indicated at 15 and housed within barrel 14, I am, therefore, referring to a lens either for camera or projector use.

I claim:

1. In a device of the character described, the combination with a primary lens and a film gate, of means for continuous film advance through said gate, a rotary prism mounted between said lens and gate having successive facets and adapted to cause apparent travel with said film of a beam of light traversing said lens, and an exposure-regulating shutter in the path of light traversing said film and lens, and means for operating said shutter in synchronism with the movement of said facets to pass said beam through successive facets at points adjacent the central portions thereof, said shutter comprising a mount and a pair of vanes adjustable respecting each other and said mount and operatively connected for equal and opposite movement whereby to vary the shutter opening while maintaining the center of said opening substantially constant respecting said facets, said prism being hollow and provided internally with corrective lens means.

2. In a device of the character described, the combination with a primary lens and a film gate, of means for continuous film advance through said gate, a rotary prism mounted between said lens and gate and adapted to cause apparent travel with said film of the image projected by said lens, and an exposure-regulating shutter in the path of light between said film and lens, said shutter comprising a mount and a pair of vanes adjustable respecting each other and said mount and operatively connected for equal and opposite movement whereby to vary the shutter opening while maintaining the center of said opening substantially constant, said shutter mount including a disk provided with an eccentric framing slot, and means for driving said disk at a rate so proportioned to the pitch of said slot and the speed of film advance as to maintain a given length of film exposed to said primary lens for a predetermined period, the adjustment of said vanes being adapted to restrict or extend said period symmetrically at its beginning and end.

3. In an optical system, the combination with a primary lens and means for the continuous, non-intermittent advance of a film planiformly in spaced relation to the lens, of a hollow prism comprising opposed parallel flats mounted for rotation on a transverse axis lying across the shortest line between the lens and the film, and an optical corrective member disposed within the prism whereby light passing between the lens and film must traverse two opposed flats of said prism and the intervening optical corrective member.

4. In an optical system, the combination with a primary lens and planiform film gate and means for advancing film across said gate at a constant rate, of a hollow prismatic body wholly disposed between the lens and gate and mounted to rotate upon an axis transverse with respect to the shortest line between the lens and gate, said prismatic body having an even number of faces in diametric opposition in parallel pairs, means for rotating said body at a predetermined constant angular rate synchronized with the rate of film advance, and corrective lens means located within said hollow prismatic body in the path of light passing between said lens and film gate through the opposing faces of said body and the intervening corrective lens means, whereby the correction effected by said lens means occurs intermediate substantially equal and opposite refractive effects of the opposing faces of said body.

5. In an optical system, the combination with an objective lens and a substantially planiform film gate in spaced relation thereto, of means for advancing film at a substantially constant rate across said gate, and means for causing apparent travel with said film of a light beam traversing said lens while maintaining an approximately constant distance of light travel between the film and lens, said means comprising a rotor offset laterally from a line between the lens and the gate with its axis substantially in the plane of said line and at right angles thereto, a hollow prism spaced from the gate and mounted on the rotor and intersecting said line, said prism comprising an even number of transparent plates symmetrically disposed about said axis with opposite plates substantially parallel and having both of a pair of opposite plates at all times interposed between said lens and the film traversing said gate, a support adjacent said prism and a fixed optical corrective means mounted on said support within said prism in the path of light traversing said prism plates between the lens and film.

6. In an optical system, the combination with an objective lens and a film gate in spaced relation thereto and to which the projected axis of the lens is substantially normal, of means for advancing film at a substantially constant rate across said gate, and means for causing apparent travel with said film of a light beam traversing said lens while maintaining an approximately constant distance of light travel between the film and lens, said means comprising a rotor having an axis in the plane of the axis of the lens and offset laterally from said lens axis and substantially at right angles thereto, a hollow prism mounted on the rotor independently of and in spaced relation to the gate and comprising an even number of transparent optical flats each of rectangular outline and in juxtaposition to comprise a substantially closed figure, said flats being symmetrically disposed about the axis of said rotor with opposite flats substantially parallel to each other and two opposite flats interposed substantially at all times between said lens and film, means for actuating said rotor in synchronism with film advance, and a support adjacent said prism provided with a fixed optical corrective means mounted within the flats of said prism substantially on the axis of said objective lens, said optical corrective means and the opposing flats of said prism constituting the entire optical apparatus intervening between said objective lens and said film.

7. In an optical system, the combination with an objective lens and means defining a film path in spaced relation to the lens and to which the projected axis of said lens is substantially normal, of means for advancing film at a substantially constant rate across said gate, means for causing apparent travel with said film of a light beam traversing said lens while maintaining an approximately constant distance of light travel between the film and lens during a predetermined limited exposure interval, said means comprising a rotor provided with means supporting it for rotation about an axis substantially in the plane of the axis of said lens and at right angles to the lens axis and to the direction of film advance, said rotor being offset from the lens axis, a hollow prism mounted on the rotor and intersected by the lens axis, said prism comprising an even number of transparent optical flats symmetrically disposed about the axis of the rotor with opposite flats in substantial parallelism and providing at substantially all times two opposed flats interposed between the lens and film, a support adjacent the prism, a fixed optical corrective means mounted on the support within the prism between the opposed flats thereof in the path of light traversing the prism flats between the lens and film, a shutter operatively mounted in the path of light traversing said lens and having an opening and speed of operation such as to restrict the passage of light to a limited angular movement of said prism, and means for operating said film, said prism, and said shutter in synchronism, with the shutter opening so disposed as to limit the passage of light to a period commencing and terminating at substantially like angles of said prism from an intermediate position in which said flats are substantially normal to the lens axis.

8. The combination set forth in claim 7 wherein the shutter comprises two adjustable leaves connected for synchronous opening and closing movement from and to each other, and mechnism for adjusting said leaves while maintaining the shutter opening centered to provide the relationship specified in claim 7.

CHARLES L. FITZ.